Aug. 25, 1931. A. C. ANDREASEN Re. 18,167

PUMP

Original Filed Jan. 21, 1927

Witnesses:
C. E. Wessels
F. E. Appleton

Inventor,
Alfred Cornelius Andreasen,
By Joshua R. H. Potts
his Attorney.

Reissued Aug. 25, 1931 Re. 18,167

UNITED STATES PATENT OFFICE

ALFRED C. ANDREASEN, OF OAK PARK, ILLINOIS, ASSIGNOR TO AIR-WAY PUMP COMPANY, OF CHICAGO, ILLINOIS, A CORPORATION OF ILLINOIS

PUMP

Original No. 1,672,401, dated June 5, 1928, Serial No. 162,518, filed January 21, 1927. Application for reissue filed August 14, 1929. Serial No. 385,771.

The present invention relates to a pump particularly adapted for use with barrels and like containers for forcing liquid therefrom.

Another important object of the invention lies in the provision of a pump for use with vessels containing liquid so that pressure may be created above the liquid to force the liquid from the vessel and means whereby the pressure may be released when desired.

A still further important object of the invention lies in the provision of a pumping mechanism that is exceedingly simple in its construction, inexpensive to manufacture, strong and durable, thoroughly reliable and efficient in operation, and otherwise well adapted to the purpose for which it is designed.

With the above and other objects in view as will appear as the description proceeds, the invention resides in certain novel features of construction, and in the combination and arrangements of parts as will be hereinafter more fully described and claimed.

In the drawings:—

Figure 1:
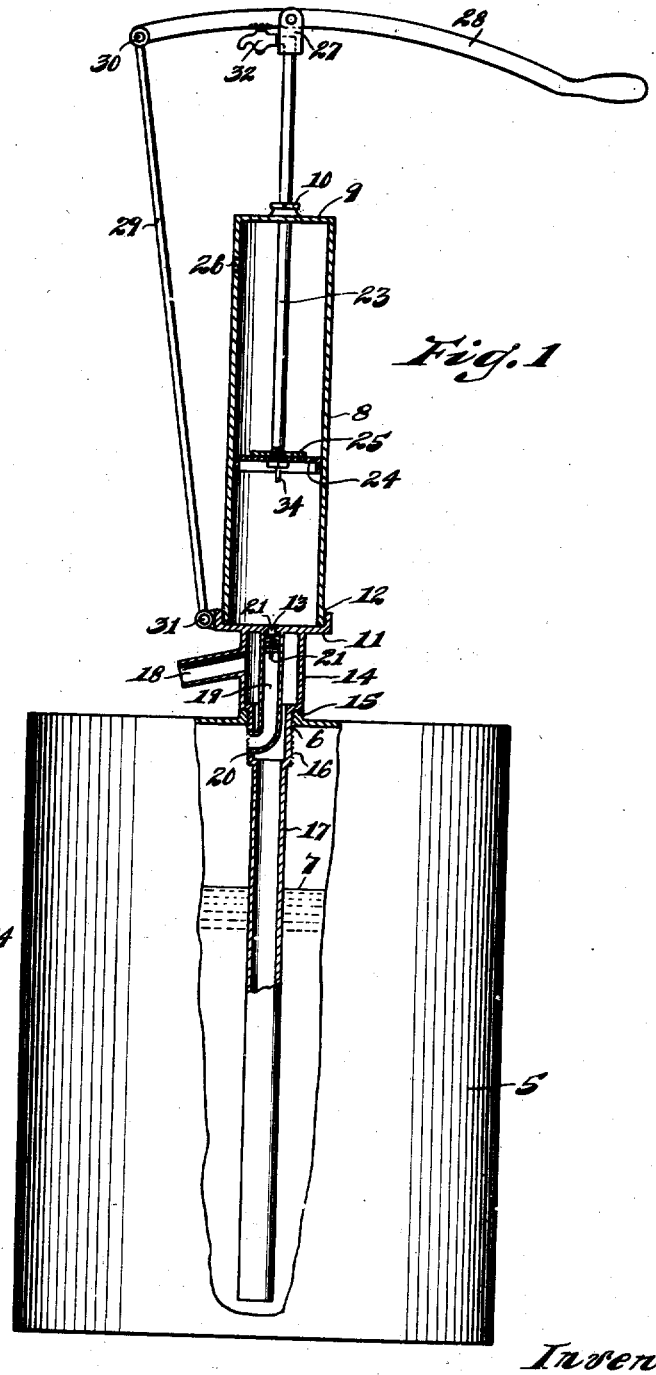
Figure 1 is a sectional view of the pump embodying the features of my invention and showing the same associated with a vessel containing fluid.

Referring to the drawings in detail it will be seen that 5 denotes a vessel in the form of a tank having a threaded opening 6 in the top thereof. This tank is clearly shown by way of example and does not form a part of the invention. The tank contains liquid as is indicated at 7.

Referring to the pumping mechanism in detail it will be seen that the numeral 8 denotes the cylinder the lower end of which is open and the upper end of which is closed as at 9 and has a stuffing box 10 in the center thereof. A head or cap 11 is threadedly engaged as at 12 on the lower openings of the cylinder 8 and has a central opening 13. A tubular member 14 extends from the head or cap 11 and is reduced intermediate its ends to form a shoulder 15 and an externally threaded portion 16 adapted to be engaged with the threaded opening 6. A pipe 17 depends from the portion 16 and is adapted to terminate in close proximity to the bottom of the tank 5. An outlet pipe 18 extends from the tubular portion 14 laterally thereof so that the hose or the like may be connected therewith for leading the liquid pumped from the tank to any desired place. A pipe 19 depends downwardly from the central portion of the head or cap 11 through the tubular member 14 and has its lower end bent laterally to extend through an opening 20 in the portion 16. A spring pressed check valve is mounted in the pipe 19 to normally close the opening 13.

Figure 2:
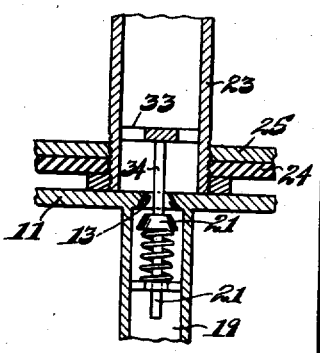
Fig. 2 is an enlarged detail sectional view through the pump showing the air pressure release.

The numeral 23 denotes a hollow plunger rod slidable through the stuffing box 10 and having a flexible plunger 24 mounted on its inner lower end in abutment with the bracing disk 25 which is smaller in diameter than the plunger. The upper portion of the cylinder is provided with a vent opening 26. The upper outer end of the plunger rod 23 has a bracket 27 mounted thereon and pivotally engaged with the lever 28. A rod 29 is pivotally engaged as at 30 with one end of the lever 28 and the other end is pivotally engaged as at 31 with the bottom of the cap 11. A spigot 32 is mounted on the upper end of the hollow plunger rod 23. A spider 33 is mounted in the lower end of the hollow plunger rod 23 as is clearly shown in Fig. 2 and has a pin 34 projecting therefrom below the lower end of said rod, so that when the plunger is in its normal position said pin 34 will engage the check valve 21 and release it from the opening 13 to leave any air pressure in the top of the tank 5 through the pipe 19.

When the lever 28 is actuated to force the plunger 24 downwardly it will be seen that air is driven through the opening 13 causing the valve 21 to open so that the air will flow through the pipe 19 into the top of the tank to set up a pressure therein. As the lever is swung upwardly the plunger 24 moves upwardly and said plunger will flex to allow air to escape thereby into the lower portion of the cylinder 8 as will be quite apparent. Thus the setting up of a rectilinear motion of the plunger will cause the creation of a head of pressure in the top of the tank bar so that the oil or like fluid 7 therein will be forced up the extension 17 through the portion 16, through the member 14 out through the pipe 18. If, for any reason, it is desired to release the pressure in the tank, it is only necessary to move the plunger to the bottom of the cylinder so that the pin 34 unseats the valve 21 and then to open the spigot 32.

It is thought that the construction, operation and advantages of the invention will now be clearly understood without a more detailed description thereof.

The present embodiment of the invention has been disclosed in detail merely by way of example since in actual practice it attains the features of advantage enumerated as desirable in the statement of the invention and the above description. It will be apparent that the changes in the details of construction, and in the combination and arrangement of parts may be resorted to without departing from the spirit or scope of the invention as hereinafter claimed or sacrificing any of its advantages.

Having thus described my invention, what I claim as new is:

1. In a pumping mechanism of the class described, the combination of a cylinder, a plunger slidable in the cylinder, a hollow plunger rod connected with the plunger and extending through one end of the cylinder to terminate exteriorly thereof, means for reciprocating the hollow rod, a manually operable valve at the outer end of the hollow plunger rod, a check valve in the other end of the cylinder, a pin extending from the plunger in an opposite direction to the rod to engage the check valve for unseating the same when the plunger approaches the check valve closely so that the manually operated valve may be opened to allow a vent passage therethrough and through the hollow plunger rod and the check valve.

2. The combination with a liquid containing tank provided with a discharge opening, a pumping mechanism constructed and arranged to be connected to said tank within said opening, said mechanism comprising an air pump, a liquid discharge pipe depending from said pump and extending within the liquid in said tank, and an air pipe extending within said liquid discharge pipe and communicating with said pump and the interior of said tank.

3. The combination with a liquid containing tank provided with a discharge opening, a pumping mechanism constructed and arranged to be connected to said tank within said opening, said mechanism comprising an air pump, a liquid discharge pipe depending from said pump and extending within the liquid in said tank, an air pipe extending within said liquid discharge pipe and communicating with said pump and the interior of said tank, and an air check valve adapted to control the passage of air through said air pipe.

4. The combination with a liquid containing tank provided with a discharge opening, a pumping mechanism constructed and arranged to be connected to said tank within said opening, said mechanism comprising an air pump, a liquid discharge pipe depending from said pump and extending within the liquid in said tank, an air pipe extending within said liquid discharge pipe and communicating with said pump and the interior of said tank, an air check valve adapted to control the passage of air through said air pipe, and means for opening said check valve to release the pressure in said tank.

5. The combination with a liquid containing tank provided with a discharge opening, a pumping mechanism constructed and arranged to be connected to said tank at the point of said opening, said mechanism comprising an air pump, a tubular member secured to said pump, and providing a liquid discharge chamber, a liquid discharge pipe depending from said tubular member and adapted to extend within the liquid in said tank, and an air pipe mounted within said tubular member and communicating with said pump and the interior of said tank.

6. The combination with a liquid containing tank provided with a discharge opening, a pumping mechanism constructed and arranged to be connected to said tank at the point of said opening, said mechanism comprising an air pump, a tubular member secured to said pump, and providing a liquid discharge chamber, a liquid discharge pipe depending from said tubular member and adapted to extend within the liquid in said tank, an air pipe mounted within said tubular member and communicating with said pump and the interior of said tank, and an air check valve adapted to control the passage of air through said air pipe.

7. The combination with a liquid containing tank provided with a discharge opening, a pumping mechanism constructed and arranged to be connected to said tank at the point of said opening, said mechanism comprising an air pump, a tubular member secured to said pump, and providing a liquid discharge chamber, a liquid discharge pipe depending from said tubular member and adapted to extend within the liquid in said tank, an air pipe mounted within said tubular member and communicating with said pump and the interior of said tank, an air check valve adapted to control the passage of air through said air pipe, and means for opening said check valve to release the pressure in said tank.

8. In a pumping mechanism of the class described, the combination of an air pump cylinder, a plunger slidable in said cylinder, a tubular member adapted to provide a liquid discharge chamber, a liquid discharge pipe depending from said tubular member, an air pipe communicating with said pump and the exterior of said discharge pipe at a point below said attachment means, a liquid discharge pipe connected to said tubular member at a point above said attachment means, an air check valve in said air pipe, and means for opening said check valve.

In testimony whereof I have signed my name to this specification.

ALFRED C. ANDREASEN.